(12) United States Patent
Guettaf

(10) Patent No.: US 7,131,045 B2
(45) Date of Patent: Oct. 31, 2006

(54) SYSTEMS AND METHODS FOR SCAN TEST ACCESS USING BOND PAD TEST ACCESS CIRCUITS

(75) Inventor: Amar Guettaf, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 454 days.

(21) Appl. No.: 10/640,687

(22) Filed: Aug. 14, 2003

(65) Prior Publication Data
US 2005/0039097 A1 Feb. 17, 2005

(51) Int. Cl.
*G01R 31/28* (2006.01)
(52) U.S. Cl. .................................... 714/727; 714/729
(58) Field of Classification Search ................. 257/48; 714/724, 726, 729, 727; 324/763
See application file for complete search history.

(56) References Cited

U.S. PATENT DOCUMENTS

| | | | |
|---|---|---|---|
| 4,493,077 A | 1/1985 | Agrawal et al. | |
| 5,235,600 A | 8/1993 | Edwards | |
| 5,621,651 A | 4/1997 | Swoboda | |
| 5,812,562 A | 9/1998 | Baeg | |
| 5,859,442 A * | 1/1999 | Manning | 257/48 |
| 6,199,182 B1 * | 3/2001 | Whetsel | 714/724 |
| 6,378,093 B1 * | 4/2002 | Whetsel | 714/726 |
| 6,452,435 B1 | 9/2002 | Skergan et al. | |
| 6,539,497 B1 | 3/2003 | Swoboda et al. | |
| 6,646,460 B1 * | 11/2003 | Whetsel | 324/763 |
| 6,760,866 B1 | 7/2004 | Swoboda et al. | |
| 6,861,867 B1 | 3/2005 | West et al. | |

* cited by examiner

*Primary Examiner*—David Ton
(74) *Attorney, Agent, or Firm*—Sterne, Kessler, Goldstein & Fox P.L.L.C.

(57) ABSTRACT

The present invention is directed to circuits and methods to efficiently conduct scan testing of integrated circuits in which first level packaging is varied to provide different versions of the integrated circuit. An integrated circuit is provided that includes at least one bond pad test circuit. The bond pad test circuit is coupled between a bond pad and functional components within an integrated circuit. In one embodiment, the bond pad test circuit includes a multiplexer and a D flip-flop in which the D input of the flip-flop is coupled to a bond pad. In another embodiment, the bond pad test circuit includes a multiplexer and a D flip-flop in which the D input of the flip-flop is coupled to the output of the multiplexer. A method for scan testing using an integrated circuit with a bond pad test circuit is also provided.

7 Claims, 6 Drawing Sheets

SYSTEMS AND METHODS FOR SCAN TEST ACCESS USING BOND PAD TEST ACCESS CIRCUITS

BACKGROUND OF THE INVENTION

1. Field of the Invention

The present invention relates to integrated circuits, and more particularly, to testing of integrated circuits.

2. Background of Invention

Effective testing of integrated circuits significantly enhances the ability of integrated circuit developers and manufacturers to provide reliable devices. Various techniques have been employed to test integrated circuits during the manufacturing process. One such technique that is commonly known, and has been used within the industry for over twenty years is scan testing.

Scan testing provides an efficient approach to testing the structural integrity of devices, such as flip-flops, within a complex integrated circuit. Scan testing does not test integrated circuit-level functionality. Rather, test personnel use scan testing to confirm that individual flip-flops within an integrated circuit function properly. The sheer number of flip-flops within an integrated circuit, which is often greater than a million, presents a daunting challenge for testing. Scan testing addresses this challenge through the use of automated test units that provide test vectors to scan paths including thousands of flip-flops within integrated circuits that have been designed to support scan testing.

Typically, complex integrated circuits are designed and implemented as a series of interconnected functional blocks, each of which can be tested independently. Devices, such as flip-flops, within these functional blocks can be designed, such that they can be connected together in a scan path to support scan testing. Flip-flops and other elements within a scan path include, in addition to inputs and outputs used for normal operation, two inputs associated with the scan testing capability. These include a scan input (SI) and a scan enable (SE) input. Flip-flops within a scan path have their output connected to the SI input of a subsequent flip-flop. The first flip-flop within a scan path receives its input from an automated test unit through a test access port on the chip. The last flip-flop within a scan path provides its output to the automated test unit through a test access port. Many scan paths can exist within a single integrated circuit.

While scan testing provides significant benefits, several shortcomings exist. When a manufacturer designs an integrated circuit, many capabilities and functions are built into the integrated circuit. Not all customers will want all capabilities and functions. Rather than designing a different integrated circuit for each individual customer need, a manufacturer can include multiple functions in a circuit, and selectively enable and/or disable certain functions through different packaging. Packaging refers to how the silicon (or other material) used to create the integrated circuit is encapsulated in a protective material and what form of access is given to the integrated circuit through contact points on the packaging.

First level packaging or interconnection refers to the technology required to get electrical signals into and out of an integrated circuit—in other words the connections required between bond pads on the integrated circuit and the contact points, often pins, of the package. For example, three common types of first level packaging are wire bonding, flip chip bonding, and tape automated bonding.

The connections between a bond pad and contact point vary depending on the functions that a manufacturer wants to offer in a particular chip version. For example, when a manufacturer wants to provide a certain function, a bond pad can be connected to a contact point. Having the bond pad connected to a contact point will enable a user to access the particular feature associated with the bond pad. Conversely, a bond pad may not be connected to a contact point. In this case, the feature associated with the bond pad would not be available to a user. Alternatively, a manufacturer can couple a bond pad to ground or to a voltage source. When the bond pad is permanently coupled to a voltage source or ground, a feature is either permanently active or inactive. In this case, there is no connection between the bond pad and the contact point. When a manufacturer offers many versions of the same chip, the permutations of which bond pads are coupled to a contact point, not coupled to a contact point, coupled to ground, or coupled to a voltage source can be large.

Using different first level packaging to provide alternative versions of the same integrated circuit can significantly reduce the cost to manufacture an integrated circuit. However, this approach presents several scan testing challenges. When different first level packaging is used to produce different versions of an integrated circuit, two scan testing approaches are typically used.

The first approach is to develop test vectors for each different version of the integrated circuit and run complete scan tests for each version of the integrated circuit based on the different packaging. While providing complete tests on each integrated circuit, this approach is inefficient in that many of the same capabilities within the same base integrated circuit are being tested over and over again. In addition, developing test vectors, test set-up, and testing for each version can be prohibitively expensive.

The second approach is to run the same general purpose scan test for each version of the integrated circuit. The shortcoming of this approach is that in an integrated circuit in which a bond pad is not connected or is permanently coupled to ground or a voltage source, the scan paths associated with those bond pads can not tested. Furthermore, chip logic associated with these scan paths can also be coupled to other scan paths. Testing of those scan paths is made more difficult because the outputs from logic devices associated with scan paths that can not be tested will be an unknown or difficult to predict. Thereby, obtaining predictable results can be difficult. Thus, some flip-flops will not be tested and others will be more difficult to test.

What is needed is a circuit and methods of testing to efficiently test packaged integrated circuits in which first level packaging of an integrated circuit is varied to provide different versions of the integrated circuit.

SUMMARY OF THE INVENTION

The present invention is directed to circuits and methods to efficiently conduct scan testing of integrated circuits in which first level packaging varies to provide different versions of the integrated circuit. In particular, an integrated circuit is provided that includes at least one bond pad test circuit. The bond pad test circuit is coupled between a bond pad and functional components within an integrated circuit. In one embodiment, the bond pad test circuit includes a multiplexer and a D flip-flop in which the D input of the flip-flop is coupled to a bond pad. In another embodiment, the bond pad test circuit includes a multiplexer and a D flip-flop in which the D input of the flip-flop is coupled to the output of the multiplexer.

A method for scan testing integrated circuits having multiple selectable features is also provided. The method provides for the isolation of bond pads whose connections can vary between different versions of an integrated circuit. Once these bond pads are isolated, a first set of general test patterns are run. Upon completion of these general test patterns, the bond pads that were isolated are coupled to the logic and functional components of the integrated circuit, and a second set of bond pad test patterns are run to confirm the integrity of the bond pad connections.

There are numerous benefits associated with the use of a bond pad test circuit and associated testing methods. First, bond pad test circuits enable integrated circuit manufacturers to test all scan paths within multiple versions of the same integrated circuit. Second, bond pad test circuits can reduce the number of test patterns that must be run for different versions of the same integrated circuit. Third, bond pad test circuits significantly improve testing efficiency, and the likelihood that integrated circuits with faults will be identified through testing.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
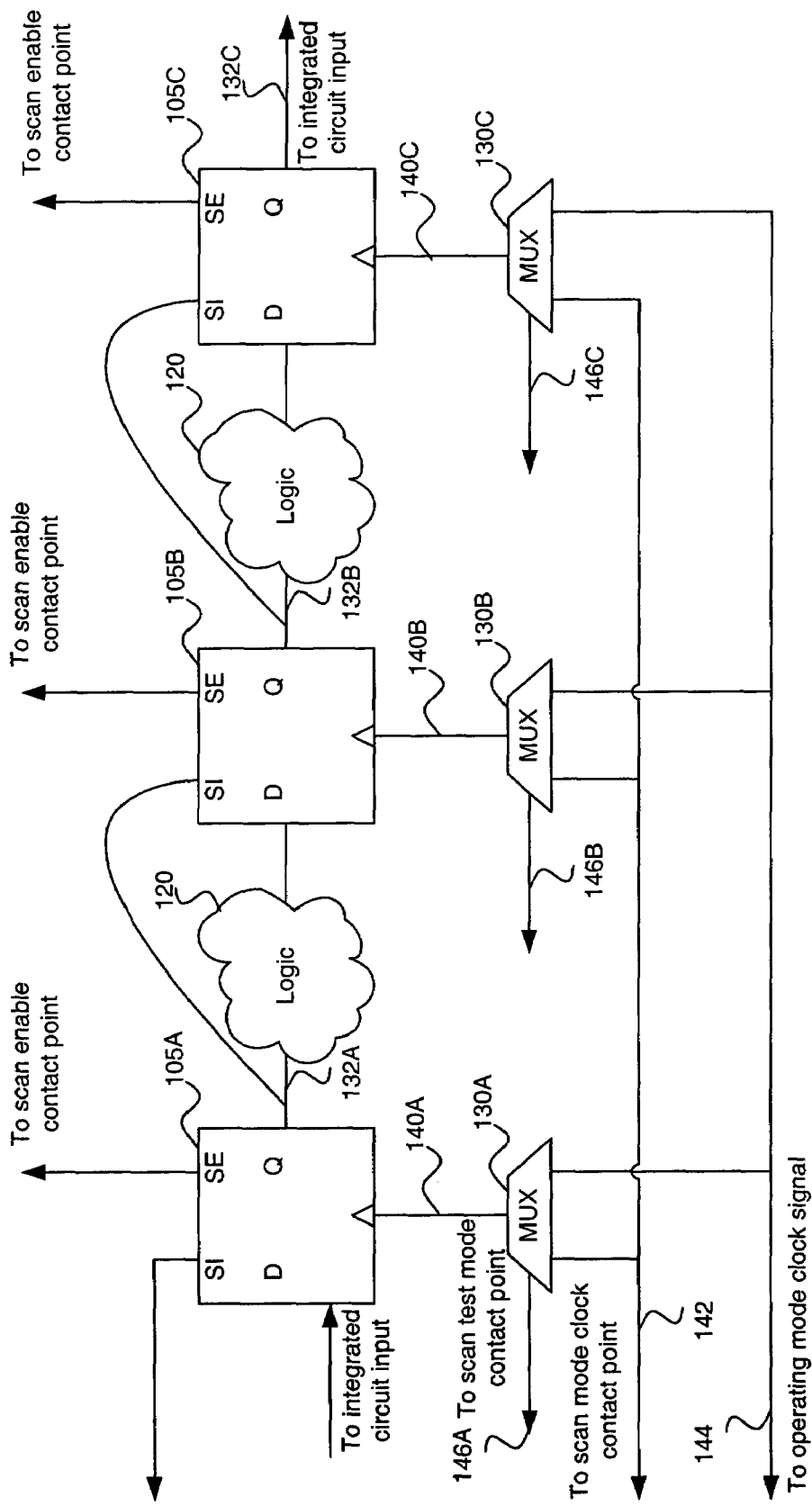
FIG. 1 is a diagram of a truncated scan path.

FIG. 1 illustrates an example of a truncated scan path within an integrated circuit. The scan path includes flip-flop 105A, flip-flop 105B, and flip-flop 105C. Flip-flop 105A represents the first flip-flop in the scan path. An SI input on flip-flop 105A is coupled to a scan input contact point. The scan input contact point provides an interface to an automated testing unit that allows test patterns to be inputted. An SE input on flip-flop 105A is coupled to a scan enable contact point.

Two modes exist within scan testing: shift mode and capture mode. In shift mode, a flip-flop will process inputs received on the SI input. The scan enable contact point provides an interface to an automated testing unit that allows the test unit to provide a signal that places a flip-flop into shift mode. In capture mode, a flip-flop will process inputs received on the D input, as would be the case in normal operating mode. In this case, a low signal is typically applied to the SE input to enter capture mode.

In general, the term contact point is used herein to refer to any electrical contact point within or on packaging that can be used to provide electrical coupling to a bond pad. The term bond pad is used herein to refer generally to any electrical contact within or on an integrated circuit that can be used to provide coupling to a contact point.

Output 132 of each flip-flop in a scan path is coupled to an SI input of the subsequent flip-flop in a scan path. For example, output 132A of flip-flop 105A is coupled to the SI input of flip-flop 105B. The output 132B of flip-flop 105B is coupled to the SI input of flip-flop 105C. As flip-flop 105C represents the last flip-flop in the scan path, its output 132C is coupled to an output contact point that can be coupled to the automated test unit to enable the test unit to monitor the output patterns during testing. Additionally, outputs 132 from flip-flops 105 are connected to other devices (e.g., logic 120) for normal operation—non-scan test mode—supporting integrated circuit logic and operations.

Clock inputs 140 for each of flip-flops 105 are received from a multiplexer, such as multiplexers 130A, 130B, and 130C. Multiplexers 130 are coupled to clock signal inputs 142 and 144. Clock signal 144 is used for normal operation. Clock signal 142 is used in scan testing mode. In addition, as discussed further below, memory and other functional components contained within logic 120 will receive a clock signal. Each of multiplexers 130A, 130B, and 130C have a control input 146 connected to a scan test mode contact point. When scan testing is to take place, an automated test unit controls multiplexers 130A, 130B, and 130C via control inputs 146 to connect the scan testing mode clock signal 142 to the flip-flop clock inputs 140.

When scan testing takes place, normal operation is suspended and each flip-flop, such as flip-flops 105, within a scan path under test is instructed through the SE input to enter scan test shift mode. For example, a high signal may be placed on this input to enter scan test shift mode. Once the flip-flop, such as flip-flops 105, is in scan test shift mode mode, a test input signal will be inputted from a test vector to the SI input. One or more scan test clock signals, such as clock signal 142, can then be provided to the flip-flops under test to toggle the flip-flops and to clock out a scan test output. This output is compared to a reference pattern to verify correct operation. Differences between the reference pattern and output indicate some form of defect (e.g. flip-flop defects, connection between flip-flops defect, scan test defect), and the integrated circuit will be rejected, or subjected to additional tests. This procedure is typically repeated many times for different scan paths within an integrated circuit and using different test vectors, which are often referred to as a scan patterns.

Figure 2:
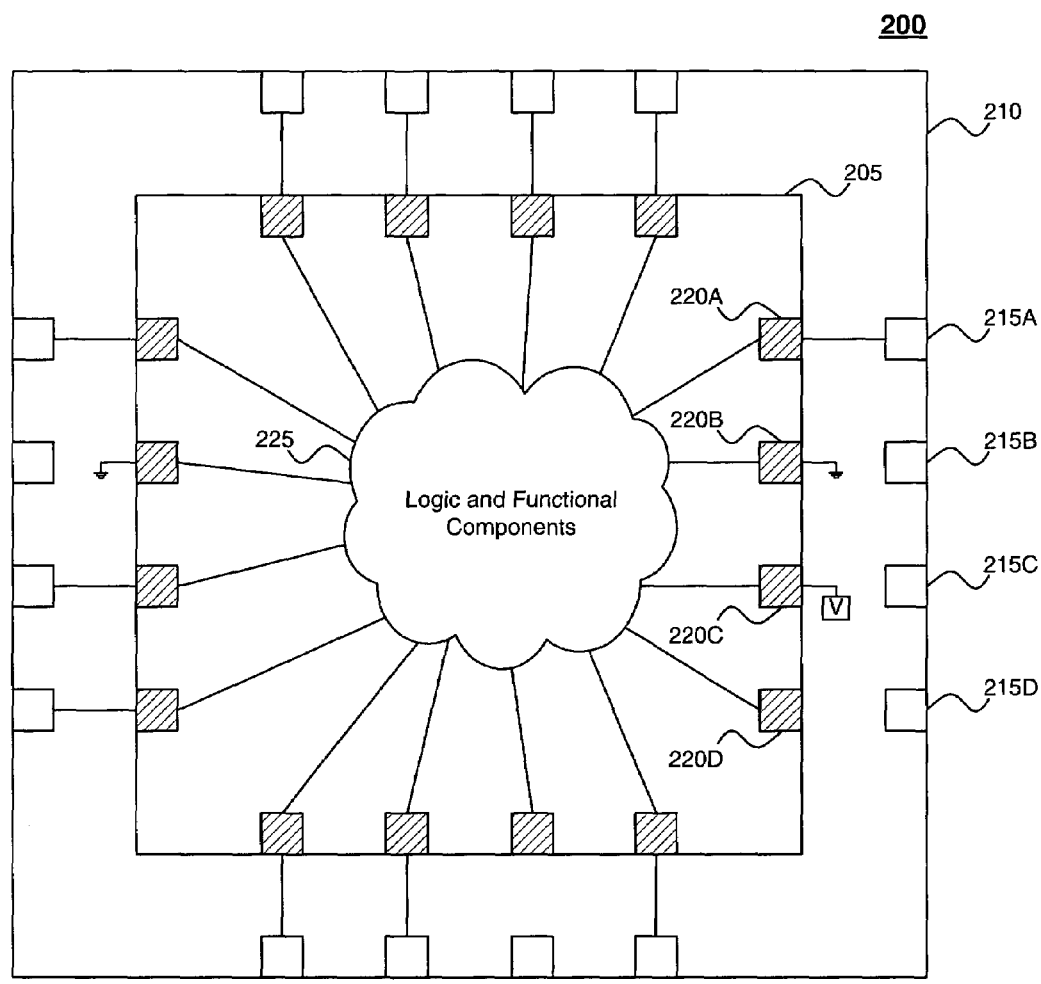
FIG. 2 is a diagram of a packaged integrated circuit.

FIG. 2 provides a packaged integrated circuit 200. Packaged integrated circuit 200 includes integrated circuit 205 and package 210. Integrated circuit 205 includes sixteen bond pads, such as bond pads 220A, 220B and 220C. Package 210 includes sixteen contact points, such as contact points 215A, 215B and 215C. An integrated circuit can have any number of bond pads depending on complexity and size, common numbers of bond pads include 16, 32, 64 and 128. Similarly, contact points can be referred to in many ways, such as contact pins.

Bond pads can be configured in four ways depending on how a feature associated with a bond pad will be used. When a manufacturer wants a feature to be externally accessible, bond pads associated with that function will be coupled to a contact point. For example, bond pad 220A is coupled to contact point 215A. When a manufacturer does not want to provide a certain function, bond pads associated with that function will not be connected to contact points. For example, bond pad 220D is not coupled to contact point 215D. Alternatively, a bond pad associated with a function that is not to be provided can be connected to ground to disable the function. For example, bond pad 220B is coupled to ground. Lastly, if a function is always desired to be active, a bond pad associated with that function can be coupled to a high signal. For example, bond pad 220C is coupled to a voltage source.

Figure 3:
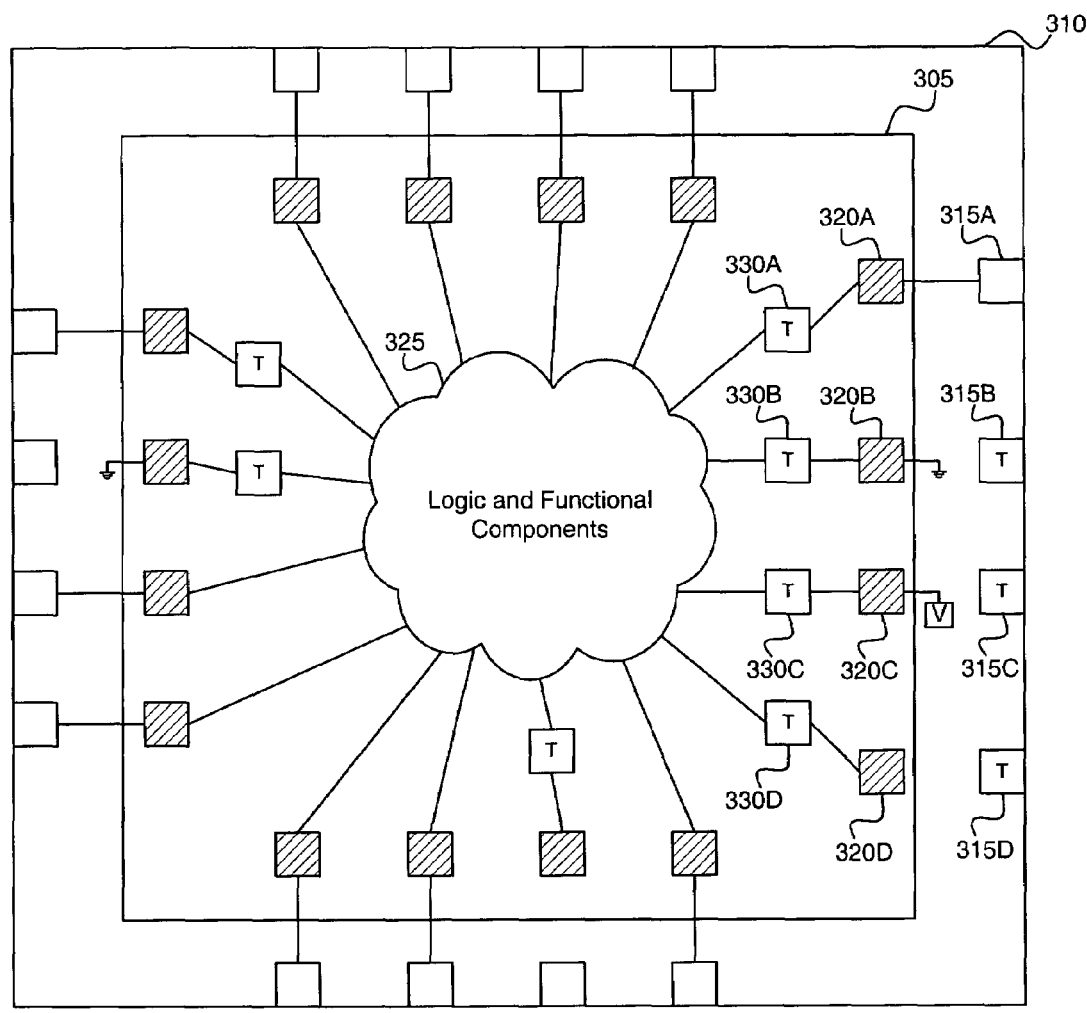
FIG. 3 is a diagram of a packaged integrated circuit, according to an embodiment of the invention.

FIG. 3 is a block diagram of a packaged integrated circuit 300, according to an embodiment of the invention. Packaged integrated circuit 300 includes an integrated circuit 305 and a package 310. Integrated circuit 305 includes logic and functional components 325; bond pads, such as bond pads 320A, 320B, 320C and 320D; and bond pad test access circuits, such as bond pad test access circuits 330A, 330B, 330C and 330D. Package 310 includes contact points, such as contact points 315A, 315B, 315C, and 315D. Logic and functional components 325 can include memory, registers and other components commonly found within an integrated circuit, as will be known by individuals skilled in the relevant arts.

In one embodiment, each bond pad 320 is associated with a corresponding contact point 315. For example, bond pad 320A is associated with contact point 315A. Bond pad 320B is associated with contact point 31 SB. Bond pad 320C is associated with contact point 315C. Bond pad 320D is associated with contact point 31 SD. In alternative embodiments a bond pad can be associated with more than one contact point, and vice versa.

As discussed above, a bond pad can be connected in one of four configurations. In one configuration, a bond pad is electrically coupled to its corresponding contact point, such as in the case of bond pad 320A and a contact point 315A. This configuration can be used when a function within integrated circuit 305 associated with bond pad 320A is to be accessible external to package 310. In a second configuration, a bond pad is not electrically coupled to a corresponding contact point, but is instead coupled to ground, such as in the case of bond pad 320B. This configuration can be used when a function with integrated circuit 305 is to be disabled or always configured in a present manner. In a third configuration, a bond pad is not electrically coupled to a corresponding contact point, but is instead coupled to a pre-set voltage level, such as in the case of bond pad 320C. This configuration can be used when a function with integrated circuit 305 is to be disabled or always configured in a pre-set manner. In a fourth configuration, a bond pad is not electrically coupled to a corresponding contact point, such as in the case of bond pad 320D and contact point 31 SD. This configuration can be used when a function within integrated circuit 305 is not to be accessible external to package 310.

The relationship between bond pads and contact points can vary depending on the version of packaged integrated circuit 300. Integrated circuit manufacturers can develop a feature rich integrated circuit, in which only certain features or functions may be active or accessible to a customer. Thus, for example in one version of packaged integrated circuit 300, bond pads 320A through 320D can be configured as shown in FIG. 3. However, in another version bond pads 320A through 320D can all be electrically coupled to their corresponding contact points.

A bond pad test access circuit, such as bond pad test access circuit 330A, 330B, 330C or 330D enables scan testing of scan paths within integrated circuit 305 that otherwise would lead to significant difficulties conducting scan testing as described above. As is discussed with respect to FIGS. 4 and 5, numerous embodiments of bond pad test circuits can exist. A bond pad test circuit, such as bond pad test circuits 330A, 330B, 330C or 330D can be coupled between a bond pad and logic and functional components 325. When positioned in this manner, a bond pad test circuit enables scan testing of flip-flops that are contained within a scan path associated with a bond pad regardless of the bond pad configuration (i.e., whether the bond pad is coupled to a contact point, not coupled to a contact point, coupled to ground, or coupled to a voltage source). Additionally, a bond pad test circuit can enable testing of the connection between the first flip-flop in a scan path and the connection to a fixed source or ground.

In one embodiment, a bond pad test circuit is coupled to only one bond pad. For example, bond pad test access circuit 330A is coupled to contact point 320A. Bond pad test access circuit 330B is coupled to contact point 320B. Bond pad test access circuit 330C is coupled to contact point 320C. Bond pad test access circuit 330D is coupled to contact point 320D. In an alternative embodiment, a bond pad test access circuit can be coupled to multiple bond pads.

Figure 4:
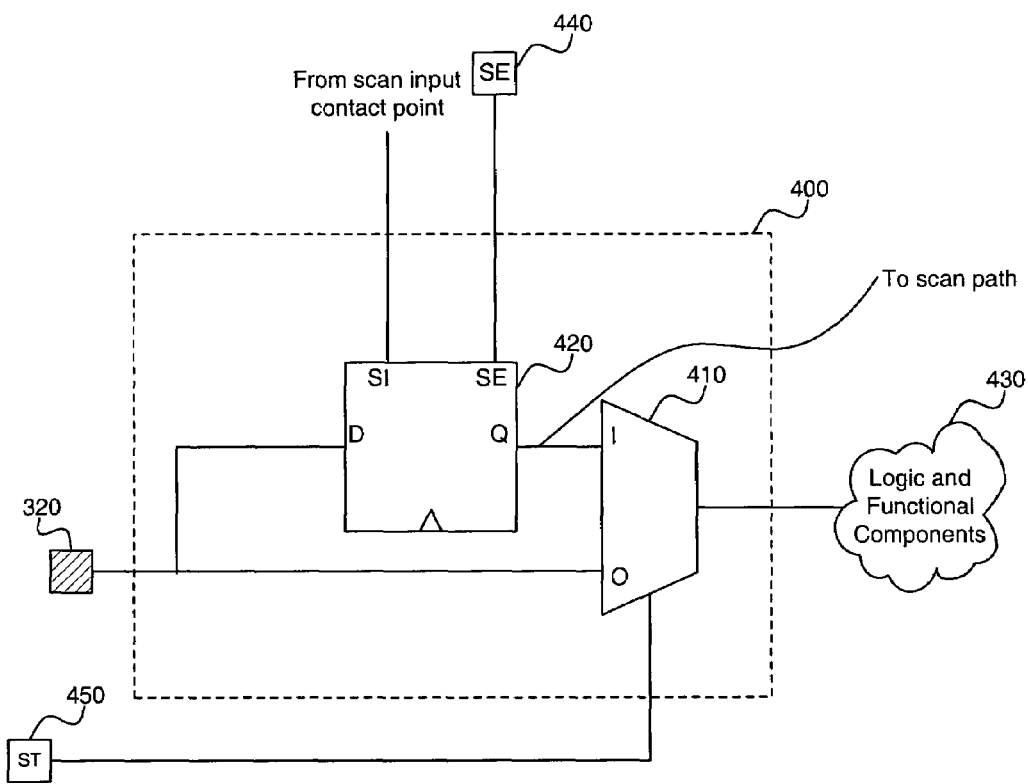
FIG. 4 is a diagram of a bond test circuit that can be used when a bond pad is either coupled to a contact point or is not coupled to a contact point, according to an embodiment of the invention.

FIG. 4 is an example diagram of bond pad test circuit 400 that can be used when a bond pad is either coupled to a contact point or is not coupled to a contact point, according to an embodiment of the invention. For example, bond pad test circuit 400 can be used as bond pad test circuit 330A or 330D.

Bond pad test circuit 400 includes multiplexer 410 and D flip-flop 420. Multiplexer 410 includes two data inputs and a control input. One data input of multiplexer 410 is coupled to the Q output of D flip-flop 420. A second data input of multiplexer 410 is coupled to a bond pad, such as bond pad 320. The control input of multiplexer 410 is coupled to scan test mode input 450. Scan test mode input 440 provides a signal that controls which data input will be passed through multiplexer 410. Under normal operation scan test mode input 440 controls multiplexer 410 to transmit the signal received from bond pad 320. When testing is underway, scan test mode input 440 controls multiplexer 410 to transmit the signal received from D flip-flop 420. The output of multiplexer 410 is coupled to logic and functional components 430 within an integrated circuit.

D flip-flop 420 includes four inputs and one output. D flip-flop 420 includes a D input that is coupled to bond pad 320 and a clock input. Additionally, D flip-flop 420 includes a SI input and a SE input. The SI input is coupled to a scan input signal that will be used to receive a scan pattern input when scan testing is underway. The SE input is coupled to scan enable contact point 440.

When scan testing is underway, a scan enable signal will be present on scan enable contact point 440 that places D flip-flop 420 into scan testing shift mode. A Q output of D flip-flop 420 is coupled to one of the inputs of multiplexer 410. In addition the Q output is coupled to a SI input of a subsequent D flip-flop (not shown in FIG. 4) to facilitate scan testing.

Figure 5:
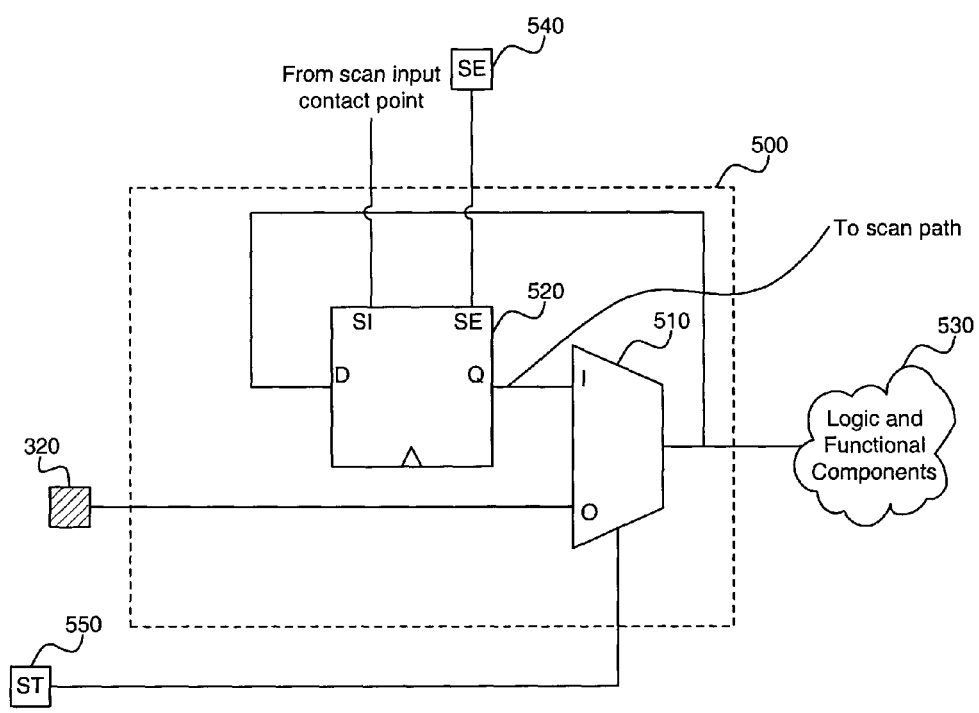
FIG. 5 is a diagram of a bond test circuit that can be used when when a bond pad is either coupled to ground or to a voltage source, according to an embodiment of the invention.

FIG. 5 is an example diagram of bond pad test circuit 500 that can be used when a bond pad is designed to be coupled to ground or to a voltage source, according to an embodiment of the invention. For example, bond pad test circuit 500 can be used as bond pad test circuit 330B or 330C. Bond pad test circuit 500 can also be used when a bond pad is designed to be optionally coupled to a contact point.

Bond pad test circuit 500 includes multiplexer 510 and D flip-flop 520. Multiplexer 510 includes two data inputs and a control input. One data input of multiplexer 510 is coupled to the Q output of D flip-flop 520. A second data input of multiplexer 510 is coupled to a bond pad, such as bond pad 320. The control input of multiplexer 510 is coupled to a scan test mode input 550. Scan test mode input 550 provide a signal that controls which data input will be passed through multiplexer 510. Under normal operation, scan test mode input 550 controls multiplexer 510 to transmit the signal received from bond pad 320. The output of multiplexer 510 is coupled to logic and functional components 530 within an integrated circuit and is also coupled back to the D input of D flip-flop 520.

D flip-flop 520 includes four inputs and one output. D flip-flop 520 includes a D input that is coupled the output of multiplexer 510 and a clock input. Additionally, D flip-flop 500 includes a SI input and a SE input. The SI input is coupled to a scan input signal that will be used to receive a scan pattern input when scan testing is underway. The SE input is coupled to scan enable contact point 540.

When scan testing is underway, a scan enable signal will be present on the scan enable contact point that places D flip-flop 520 into scan testing mode. A Q output of D flip-flop 520 is coupled to one of the inputs of multiplexer 410. In addition Q output is coupled to a SI input of a subsequent D flip-flop to facilitate scan testing.

While two embodiments of a bond pad test circuit have been provided in FIGS. 4 and 5, based on the teachings herein individuals skilled in the relevant arts will be able to determine other variations of these circuits. The embodiments provided herein are exemplary, and other variations that can be developed by varying the type of flip-flop, the interconnection of devices and the choice of circuit elements are intended to be covered by the disclosures herein.

Figure 6:
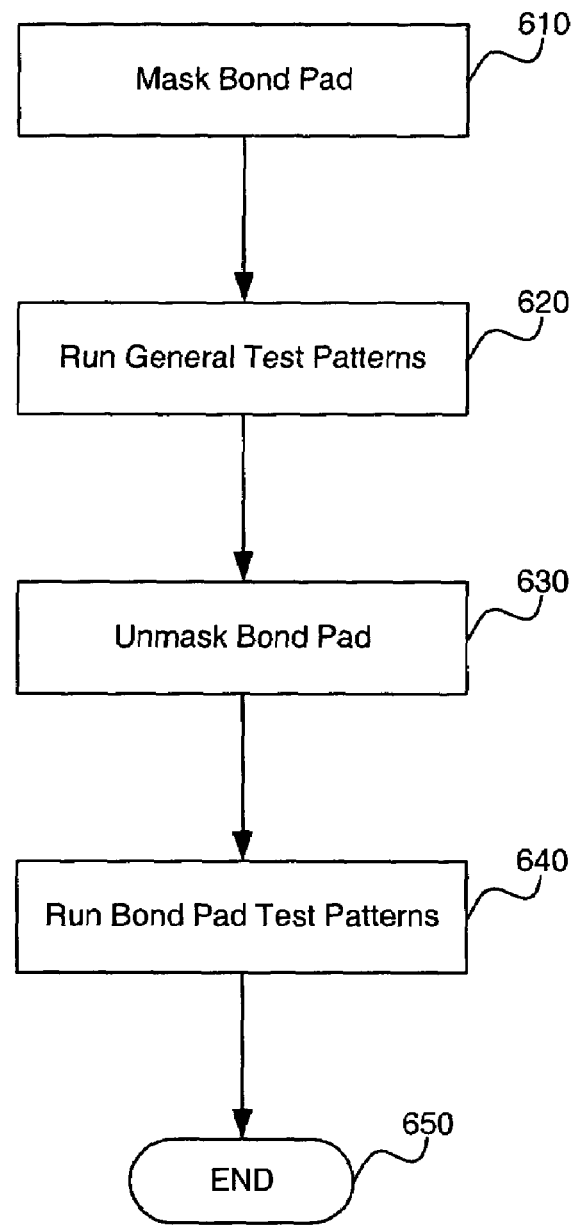
FIG. 6 is a flow chart of a scan testing method, according to an embodiment of the invention.

FIG. 6 provides a flow chart of scan testing method 600, according to an embodiment of the invention. Method 600 begins in step 610. In step 610 a bond pad is masked. For example, in one embodiment a bond pad test circuit, such as the one illustrated in FIG. 5 can be used. In this case, bond pad 320 is masked by presenting an indication that scan test mode should be invoked to multiplexer 510. Upon receiving this indication, multiplexer 510 will mask bond pad 320 from an integrated circuit and only permit electrical signals to be transmitted from D flip-flop 520 into logic and functional components 530 of the integrated circuit.

In step 620, general test patterns are run. These general test patterns include test sequences that are applicable to multiple versions of an integrated circuit regardless of the features that have been enabled or disabled as a result of the type of packaging. These general test patterns can be very extensive and include tens of thousands of different scan test patterns. If the output from the integrated circuit generated during testing matches expected output patterns, the integrated circuit under test is considered to have passed the general testing phase.

In step 630, the bond pad that was isolated in step 610 is unmasked to the integrated circuit under test. For example, as in step 610 bond pad test circuit 500 can be used. Multiplexer 510 will receive an indication that scan testing mode is no longer enabled from scan test mode contact point 550. Upon receipt of this indication, multiplexer 510 will permit electrical signals to be transmitted from bond pad 320 into logic and functional components 530 of an integrated circuit and prevent signals from D flip-flop 520 from being transmitted into the integrated circuit.

In step 640, bond pad test patterns are run. The bond pad test patterns will be a set of relatively simple test patterns. In one embodiment, these bond pad test patterns can be used to confirm that a connection to ground through a bond pad, such as in the case of bond pad 320B in FIG. 3 is properly coupled to ground. Similarly, these bond pad test patterns can be used to confirm that a connection to a voltage source, such as in the case of bond pad 320C in FIG. 3 is properly coupled to ground. If the output from the integrated circuit generated during testing matches expected output patterns, the integrated circuit under test is considered to have passed the bond pad testing phase. In step 650, method 600 ends.

In one embodiment, in step 610 all bond pads that are not externally coupled to a contact point residing on the packaging for an integrated circuit can be masked simultaneously. Similarly, in step 630 all bond pads that were masked in step 610 can be connected. In alternative embodiments, a non-inclusive set of bond pads that are not externally coupled to a contact point residing on the packaging for an integrated circuit can be isolated. Similarly, in step 630 all bond pads that were isolated in step 610, or a subset can be connected. Individuals skilled in the relevant arts will determine the precise manner in which bond pads are isolated and connected based on design criteria and testing efficiency considerations.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. An integrated circuit having bond pads and a bond pad test circuit, wherein said bond pad test circuit comprises:
   a flip-flop with an input coupled to a bond pad;
   a multiplexer with a first input coupled to the bond pad and a second input coupled to an output of said flip-flop,
   wherein an output of said multiplexer is coupled to a scan input of another device within said integrated circuit,
   wherein said multiplexer further comprises a scan test mode input for controlling whether said multiplexer is in scan test mode; and
   wherein said bond pad test circuit enables scan testing of devices within said integrated circuit that are coupled to bond pads that are not electrically coupled external to a package that encapsulates said integrated circuit.

2. The integrated circuit of claim 1, wherein said bond pad test circuit enables scan testing of devices within said integrated circuit that are coupled to bond pads that remain in an open condition.

3. The integrated circuit of claim 1, wherein a contact point is coupled to said multiplexer that is external to said package that enables the multiplexer to be toggled between scan test mode and normal operation.

4. The integrated circuit of claim 1, wherein said bond pad test circuit enables scan testing of devices within said integrated circuit that are coupled to bond pads that are coupled to a fixed voltage or ground.

5. A method for scan testing an integrated circuit that includes at least one bond pad test circuit, comprising the steps of:
 (a) toggling a multiplexer coupled to a scan input of a device within the integrated circuit to enable running general scan test patterns;
 (b) masking bond pads corresponding to said at least one bond pad test circuit;
 (c) running general scan test patterns;
 (d) toggling the multiplexer coupled to the scan input of the device within the integrated circuit to enable running bond pad test patterns;
 (e) unmasking said bond pads corresponding to said at least one bond pad test circuit; and
 (f) running bond pad test patterns for at least one of said bond pads corresponding to a bond pad test circuit.

6. The method of claim 5, wherein said masking of bond pads comprises applying a scan test mode signal to said at least one bond pad test circuit.

7. The method of claim 5, wherein said unmasking of bond pads comprises applying a normal operation signal to said at least one bond pad test circuit.

* * * * *